US008526495B2

United States Patent
Liu et al.

(10) Patent No.: US 8,526,495 B2
(45) Date of Patent: Sep. 3, 2013

(54) APPARATUS AND METHOD OF CONSTRAINED PARTITION SIZE FOR HIGH EFFICIENCY VIDEO CODING

(75) Inventors: Shan Liu, San Jose, CA (US); Yu-Wen Huang, Taipei (TW); Yung-Chang Chang, Taipei (TW); Shaw-Min Lei, Hsin-chu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 331 days.

(21) Appl. No.: 13/012,811

(22) Filed: Jan. 25, 2011

(65) Prior Publication Data

US 2012/0128067 A1 May 24, 2012

Related U.S. Application Data (60) Provisional application No. 61/416,188, filed on Nov. 22, 2010, provisional application No. 61/427,312, filed on Dec. 27, 2010.

(51) Int. Cl.
*H04B 1/66* (2006.01)
*H04N 7/26* (2006.01)

(52) U.S. Cl.
USPC ................... 375/240.12; 375/240.25

(58) Field of Classification Search
USPC ...... 382/232, 238, 240, 242, 233; 348/384.1; 375/240.01–240.28
See application file for complete search history.

(56) References Cited

U.S. PATENT DOCUMENTS

| | | | | |
|---|---|---|---|---|
| 2012/0082210 | A1* | 4/2012 | Chien et al. | 375/240.02 |
| 2012/0106629 | A1* | 5/2012 | Zheng et al. | 375/240.02 |
| 2012/0320990 | A1* | 12/2012 | Chen et al. | 375/240.25 |

* cited by examiner

*Primary Examiner* — Behrooz Senfi
(74) *Attorney, Agent, or Firm* — Blairtech Solution LLC (57) ABSTRACT

An apparatus and method for video coding and decoding with constrained PU partition are disclosed. In the High Efficient Video Coding (HEVC) system, rate-distortion function or other performance criterion usually is evaluated for various CU partition and PU partition during the encoding process in order to select a configuration with best possible performance. The PU design in the current HEVC development results in some redundancy that causes rate-distortion function or other performance criterion repeatedly evaluated for same PU configuration. Accordingly, constrained PU partition is developed to eliminate or reduce the redundancy in processing. Furthermore, necessary syntax to convey the information related to constrained PU partition between an encoder and a decoder is developed. Systems embodying the present invention has been shown to result in sizeable reduction in encoding and decoding time while the performance in terms of RD-rate remains approximately the same or slightly higher than a conventional HEVC system.

20 Claims, 9 Drawing Sheets

| prediction_unit( x0, y0, CurrCuSize ) { | C | Descriptor |
|---|---|---|
| ... | | |
| if( !entropy_coding_mode_flag ) { | | |
|   mode_table_idx | 2 | vlc(n, v) |
| } else { | | |
|   if( slice_type != I ) | | |
|     pred_mode | 2 | ae(v) |
|   } | | |
| if( PredMode == INTRA ) { | | |
|   if( entropy_coding_mode_flag && CurrCuSize == SmallestCuSize) | | |
|     intra_split_flag | 2 | ae(v) |
|   ... | | |
| } | | |
| else if( PredMode == INTER ) { | | |
|   if( entropy_coding_mode_flag ) | | |
|     inter_partitioning_idc | 2 | ae(v) |
|   ... | | |
| } | | |
| ... | | |
| } | | |

Depth = k
One INTER CU

Allow NxN Pus for
the depth-k CU

Depth = k+1
Split into 4 INTER CUs

Disallow 2N'x2N' Pus for
the depth-(k+1) CU

*Fig. 12*

Depth = k
One INTRA CU

Allow NxN Pus for
the depth-k CU

Depth = k+1
Split into 4 INTRA CUs

Disallow 2N'x2N' Pus for
the depth-(k+1) CU

APPARATUS AND METHOD OF CONSTRAINED PARTITION SIZE FOR HIGH EFFICIENCY VIDEO CODING

CROSS REFERENCE TO RELATED APPLICATIONS

The present invention claims priority to U.S. Provisional Patent Application, No. 61/416,188, filed Nov. 22, 2010, entitled "Constrained N×N Partition for High Efficiency Video Coding" and U.S. Provisional Patent Application, No. 61/427,312, filed Dec. 27, 2010, entitled "Constrained Partition Size for High Efficiency Video Coding (HEVC)". These U.S. Provisional Patent Applications are hereby incorporated by reference in their entireties.

FIELD OF THE INVENTION

The present invention relates to video processing. In particular, the present invention relates to apparatus and method for coding unit and prediction unit partition associated with high efficiency video coding.

BACKGROUND

HEVC (High Efficiency Video Coding) is an advanced video coding system being developed under the Joint Collaborative Team on Video Coding (JCT-VC) group of video coding experts from ITU-T Study Group. HEVC is block-based hybrid video coding with very flexible block structure. Three block concepts are introduced for HEVC: coding unit (CU), prediction unit (PU), and transform unit (TU). The overall coding structure is characterized by the various sizes of CU, PU and TU in a recursive fashion, where each picture is divided into largest CUs (LCUs), and each LCU consists of 64×64 pixels. Each LCU is then recursively divided into smaller CUs until leaf CUs or smallest CUs are reached. Once the splitting of CU hierarchical tree is done, each leaf CU is subject to further split into prediction units (PUs) according to prediction type and PU partition. For temporal prediction, the PU types consist of SKIP, MERGE, DIRECT and INTER modes. For spatial prediction, the PU type consists of INTRA mode. For each 2N×2N leaf CU, one partition size is selected. When the PredMode (Prediction Mode) is SKIP, MERGE or DIRECT, the only allowed Part Size (Partition Size) is {2N×2N}. When the PredMode is INTER, the allowed Part Size is selected from {2N×2N, 2N×N, N×2N, N×N}. When the PredMode is INTRA, the allowed Part Size is selected from {2N×2N, N×N}.

BRIEF SUMMARY OF THE INVENTION

An apparatus and method for video coding with constrained partition for prediction units are disclosed. The method according to the present invention comprises receiving a 2N×2N leaf CU (coding unit) at depth k, wherein N is a first integer greater than 0 and k is a second integer greater than or equal to 0, partitioning the 2N×2N leaf CU into a set of PUs (prediction units) according to a prediction mode of the 2N×2N leaf CU, wherein the set includes N×N partition size and the prediction mode includes an INTER mode and an INTRA mode, and removing the N×N partition size for the prediction mode if the 2N×2N leaf CU is larger than SCU (smallest CU), wherein a constrained set of PUs is formed when the partition size is removed. An alternative apparatus and method for video coding with constrained partition for prediction units are also disclosed. The alternative method according to the present invention comprises receiving a 2N×2N leaf CU (coding unit) at depth k, wherein N is an integer greater than 0; for each N×N leaf CU of the 2N×2N leaf CU: evaluating condition 1 to determine if k>0; evaluating condition 2 to determine if said each N×N leaf CU is a fourth leaf CU of the 2N×2N leaf CU; evaluating condition 3 to determine if three prior leaf CUs have the depth k; and evaluating condition 4 to determine if said three prior leaf CUs have a mode of same type and have N×N partition size, removing 2N×2N partition size to form a constrained partition set if the condition 1 through condition 4 are all asserted, and partitioning said each N×N leaf CU according to the constrained partition set if the condition 1 through the condition 4 are all asserted.

An apparatus and method for decoding of a video bitstream associated with video data, wherein the video data comprises a 2N×2N leaf CU (coding unit) at depth k partitioned into a set of PUs (prediction units) according to a prediction mode of the 2N×2N leaf CU, wherein the set includes N×N partition size and the prediction mode includes an INTER mode and an INTRA mode, are disclosed. The method for decoding of a video bitstream comprises performing a test to determine if the 2N×2N leaf CU is larger than SCU (smallest CU), selecting codewords for the set of PUs according to the test, and decoding the video bitstream to recover the PU partition according to the codewords selected.

DETAILED DESCRIPTION OF THE INVENTION

During the encoding process, in order to achieve best possible performance, rate-distortion function or other performance criterion usually is evaluated for various CU partition and PU partition. The PU design in the current HEVC development results in some redundancy to cause rate-distortion function or other performance criterion repeatedly evaluated for some PU configuration. For example, redundancy may exist between the configuration of "the PU of the CU with depth=k, Mode=INTER, Part Size=N×N" and the configuration of "the PU of the CU with depth=k+1, Mode=INTER, Part Size=2N×2N". The redundancy will cause unnecessary processing and waste valuable system resources. It is desired to develop constrained PU partition to eliminate or reduce the redundancy in processing. Furthermore, it is desired to design necessary syntax to convey the information related to constrained PU partition between an encoder and a decoder.

Figure 1:
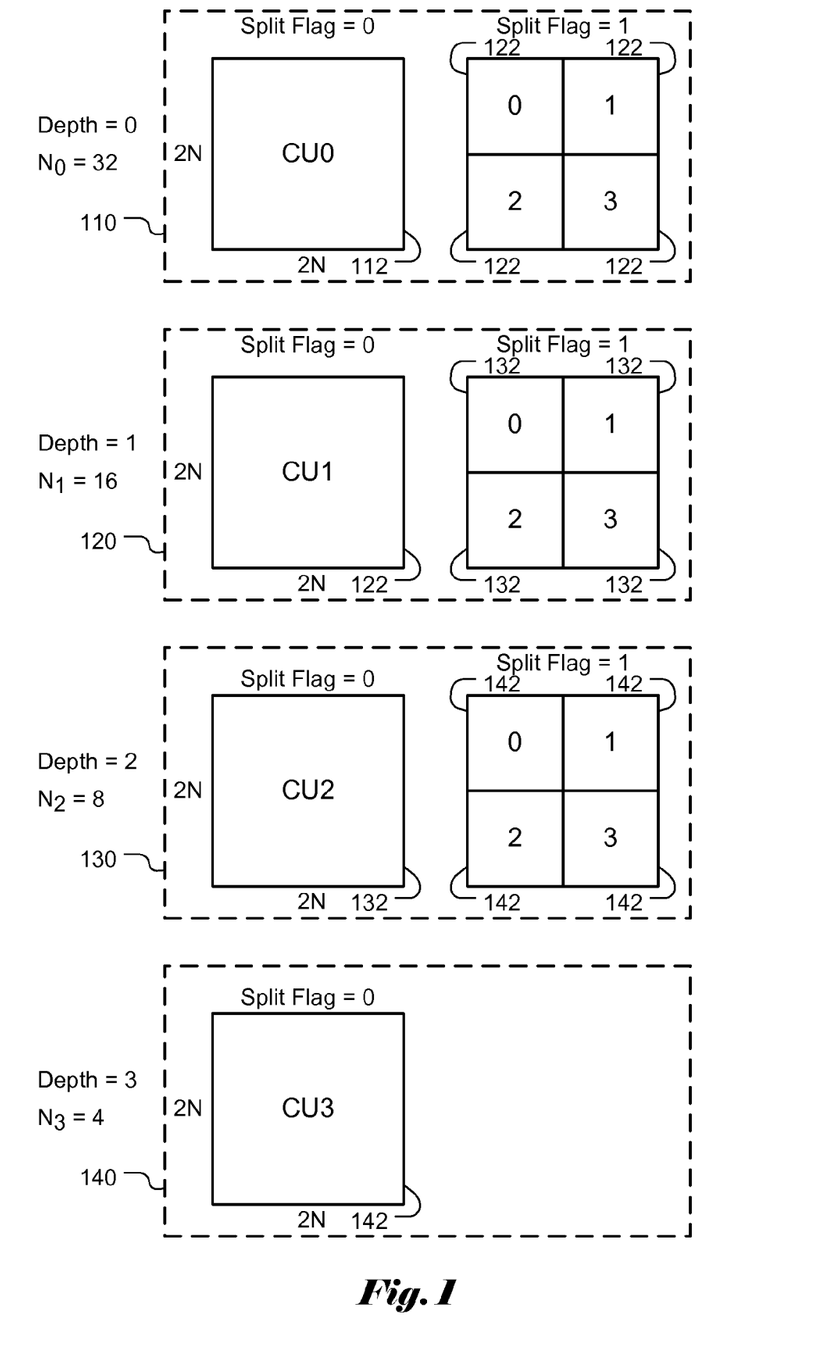
FIG. 1 illustrates an exemplary coding unit partition based on the quadtree.

In the high efficiency video coding (HEVC) system under development, the fixed-size macroblock of H.264/AVC is replaced by a flexible block, named coding unit (CU). FIG. 1 illustrates an exemplary coding unit partition based on a quadtree. At depth 0, the initial coding unit CU0, 112 consisting of 64×64 pixel, is the largest CU (LCU). The initial coding unit CU0, 112 is subject to quadtree split as shown in block 110. A split flag 0 indicates that the underlying CU is not split and, on the other hand a split flag 1 indicates the underlying CU is split into four smaller coding units CU1, 122 by the quadtree. The resulting four coding units are labeled as 0, 1, 2 and 3 and each resulting coding unit becomes a coding unit for further split in the next depth. The coding units resulted from coding unit CU0, 112 are referred to as CU1, 122. After a coding unit is split by the quadtree, the resulting coding units are subject to further quadtree split unless the coding unit reaches a pre-specified smallest CU (SCU) size. Consequently, at depth 1, the coding unit CU1, 122 is subject to quadtree split as shown in block 120. Again, a split flag 0 indicates the underlying CU is not split and, on the other hand a split flag 1 indicates the underlying CU is split into four smaller coding units CU2, 132 by the quadtree. The coding unit CU2, 132, has a size of 16×16 and the process of the quadtree splitting as shown in block 130 can continue until a pre-specified smallest coding unit is reached. For example, if the smallest coding unit is chosen to be 8×8, the coding unit CU3, 142 at depth 3 will not be subject to further split as shown in block 140. The collection of quadtree partitions of a picture to form variable-size coding units constitutes a partition map for the encoder to process the input image area accordingly. The partition map has to be conveyed to the decoder so that the decoding process can be performed accordingly.

Figure 2:
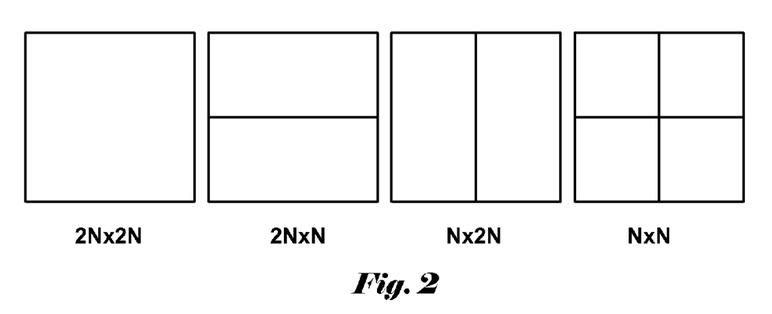
FIG. 2 illustrates allowed partition sizes of prediction unit for a 2N×2N leaf coding unit.
Figure 3:
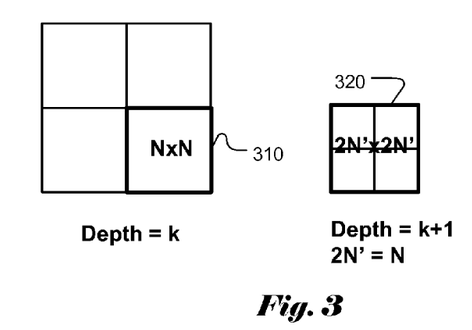
FIG. 3 illustrates an example of redundancy problem for prediction unit at depths k and k+1.

Besides the concept of coding unit, the concept of prediction unit (PU) is also introduced in HEVC. Once the splitting of CU hierarchical tree is done, each leaf CU is subject to further split into prediction units (PUs) according to prediction type and PU partition. For temporal prediction, the PU types consist of SKIP, MERGE, DIRECT and INTER modes. For spatial prediction modes, the PU type consists of INTRA mode. For each 2N×2N leaf CU, one partition size is selected. When the PredMode (Prediction Mode) is SKIP, MERGE or DIRECT, the only allowed Part Size (Partition Size) is {2N×2N}. When the PredMode is INTER, the allowed Part Size is selected from the set {2N×2N, 2N×N, N×2N, N×N} as shown in FIG. 2. When the PredMode is INTRA, the allowed Part Size is selected from the set {2N×2N, N×N}. The PU design in the current HEVC development results in some redundancy. For example, redundancy may exist between the configuration of "the PU of the CU with depth=k, Mode=INTER, Part Size=N×N" and the configuration of "the PU of the CU with depth=k+1, Mode=INTER, Part Size=2N×2N" as shown in FIG. 3. The PU 310 at depth k will be processed again at depth (k+1) as the PU 320. The PU 310 is selected under the INTER mode with partition size N×N. On the other hand, the PU 320 is selected at the INTER mode with partition size 2N'×2N', where 2N'=N. Consequently, the same block will be processed twice at depths k and depth (k+1). The redundancy will cause unnecessary processing and waste valuable system resources.

Figure 4:
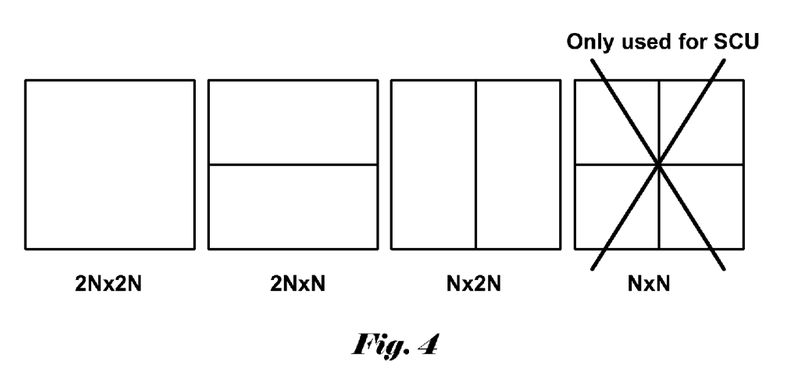
FIG. 4 illustrates an example of constrained partition set for a 2N×2N leaf coding unit to avoid redundancy for INTER prediction.

In order to eliminate the above redundancy, the allowable partition sizes are constrained according to one embodiment of the present invention as shown in FIG. 4. Consequently, for each leaf CU larger than SCU (smallest CU), the partition sizes allowed are 2N×2N, 2N×N and N×2N. In other words, the N×N partition is not allowed for INTER mode if the leaf CU is larger than SCU. If the leaf CU size is the same as SCU size, all partition sizes, 2N×2N, 2N×N, N×2N, and N×N, are allowed. When a CU size is the same as SCU size, the CU is not subject to further split and the inclusion of N×N partition size will not cause redundancy. Table 1 illustrated the system performance comparison against conventional HEVC PU partition for Random Access High Efficiency configuration. The system performance in terms of BD-rates for YUV components, encoding time and decoding time. The BD (Bjøntegaard-delta)-Rate is a standardized method for measuring percentage of bit rate savings at equal PSNR or decibels of PSNR benefit at equal bit rate, which is widely used in the field of video compression. A negative BD-rate means bitrate reduction and a positive BD-rate means bitrate increase. The comparisons are performed based on different video test materials, referred to as Class A, Class B, Class C, Class D and Class E. As shown in Table 1, the BD-rate performance is slightly higher or approximately the same as the conventional PU partition. However, the encoding time is only 88% of the conventional PU partition while decoding time is 99% of the conventional PU partition.

TABLE 1

| Random Access High Efficiency | Y BD-Rate (%) | U BD-Rate (%) | V BD-Rate (%) |
| --- | --- | --- | --- |
| Class A | 0.2 | 0.2 | 0.2 |
| Class B | 0.2 | 0.2 | 0.2 |
| Class C | 0.2 | 0.1 | 0.2 |
| Class D | 0.1 | −0.1 | 0.3 |
| All | 0.0 | 0.0 | 0.0 |
| Enc. Time | | 88% | |
| Dec. Time | | 99% | |

Table 2 illustrated the performance comparison against a conventional HEVC PU partition for Low Delay High Efficiency configuration. Again, the BD-rate performance is slightly higher or approximately the same as the conventional PU partition. However, the encoding time is only 86% of the conventional PU partition while decoding time is 98% of the conventional PU partition. Consequently, the constrained PU partition according to the present invention demonstrates the advantage of reduced encoding time and decoding time while maintaining about the same BD-rate performance as the conventional PU partition.

TABLE 2

| Low Delay High Efficiency | Y BD-Rate (%) | U BD-Rate (%) | V BD-Rate (%) |
|---|---|---|---|
| Class B | 0.1 | 0.1 | 0.0 |
| Class C | 0.1 | 0.2 | 0.2 |
| Class D | 0.1 | −0.1 | 0.4 |
| Class E | 0.0 | 0.2 | 0.5 |
| All | 0.1 | 0.1 | 0.3 |
| Enc. Time | | 86% | |
| Dec. Time | | 98% | |

Figure 5:
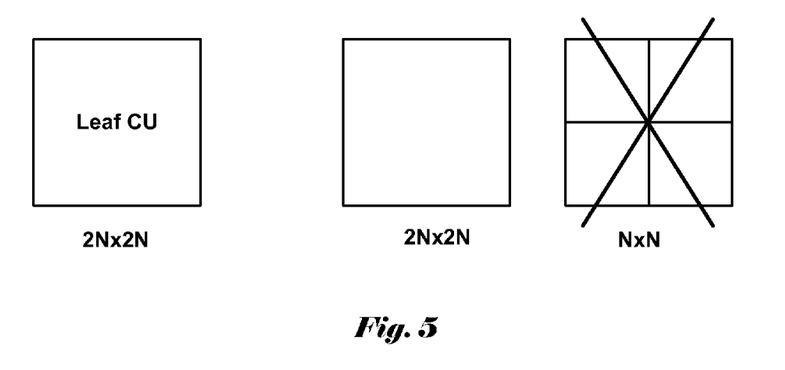
FIG. 5 illustrates an example of constrained partition set for a 2N×2N leaf coding unit to avoid redundancy for INTRA prediction.

Similarly, the PU design in the current HEVC development also results in some redundancy for the INTRA mode. For example, redundancy may exist between the configuration of "the PU of the CU with depth=k, Mode=INTRA, Part Size=2N×2N" and the configuration of "the PU of the CU with depth=k+1, Mode=INTRA, Part Size=N×N". In order to eliminate the above redundancy, the allowable partition sizes are constrained according to an embodiment of the present invention as shown in FIG. 5. Consequently, for each leaf CU larger than SCU, the only partition size allowed is 2N×2N. In other words, the N×N partition is not allowed for INTRA mode if the leaf CU is larger than SCU. If the leaf CU size is the same as SCU size, all partition sizes, 2N×2N and N×N, may be allowed. Table 3 illustrated the performance comparison against a conventional HEVC PU partition for Intra High Efficiency configuration. The BD-rate performance is slightly higher than the conventional PU partition. However, the encoding time is only 72% of the conventional PU partition while decoding time is 98% of the conventional PU partition. Consequently, the constrained PU partition according to the present invention demonstrates substantial reduction in encoding time and modest reduction in decoding time while the BD-rate performance is slightly degraded (worst case 0.7%).

TABLE 3

| All Intra High Efficiency | Y BD-Rate (%) | U BD-Rate (%) | V BD-Rate (%) |
|---|---|---|---|
| Class A | 0.3 | 0.5 | 0.7 |
| Class B | 0.2 | 0.3 | 0.4 |
| Class C | 0.2 | 0.2 | 0.3 |
| Class D | 0.1 | 0.1 | 0.1 |
| Class E | 0.3 | 0.7 | 0.7 |
| All | 0.2 | 0.3 | 0.4 |
| Enc. Time | | 72% | |
| Dec. Time | | 98% | |

In the above constrained partition sizes, the N×N size is allowed when the CU size is the same as the SCU size. Nevertheless, the N×N partition size may also be removed when the CU size is the same as the SCU size. For example, only the constrained partition sizes, 2N×2N, 2N×N, and N×2N, may be used for the INTER mode when the CU size is the same as the SCU size. Further reduction in processing time can be expected. The test results for Random Access High Efficiency configuration are shown in Table 4.

TABLE 4

| Random Access High Efficiency | Y BD-Rate (%) | U BD-Rate (%) | V BD-Rate (%) |
|---|---|---|---|
| Class A | 0.3 | 0.4 | 0.6 |
| Class B | 0.3 | 0.7 | −0.2 |
| Class C | 0.4 | 0.3 | 0.4 |
| Class D | 0.4 | 0.2 | 0.6 |
| All | 0.0 | 0.0 | 0.0 |
| Enc. Time | | 81% | |
| Dec. Time | | 97% | |

As shown in Table 4, the encoding time is further reduced to 81% from 88% in Table 1. On the other hand, the decoding time is further reduced to 97% from 99% in Table 1. The BD-rate performance is slightly degraded compared with that in Table 1. The test results for Low Delay High Efficiency configuration are shown in Table 5, where the encoding time is reduced to 81% from 86% and the decoding time increases slightly to 100% from 98% in Table 2.

TABLE 5

| Low Delay High Efficiency | Y BD-Rate (%) | U BD-Rate (%) | V BD-Rate (%) |
|---|---|---|---|
| Class B | 0.0 | 0.0 | 0.0 |
| Class C | 0.2 | 0.3 | 0.4 |
| Class D | 0.1 | −0.2 | 0.3 |
| Class E | 0.4 | 1.2 | 0.6 |
| All | 0.2 | 1.4 | 0.1 |
| Enc. Time | | 81% | |
| Dec. Time | | 100% | |

Similarly, the N×N partition size may also be restricted when the CU size is the same as the SCU size for the INTRA mode. In this case, only 2N×2N partition size is allowed when the CU size is the same as the SCU size for the INTRA mode. The test results for INTRA High Efficiency configuration are shown in Table 6, where the encoding time is reduced to 50% from 72% and the decoding time is reduced to 94% from 98% in Table 3. However, the BD-rate performance increases noticeably with a worst case of 5%.

TABLE 6

| All Intra High Efficiency | Y BD-Rate (%) | U BD-Rate (%) | V BD-Rate (%) |
|---|---|---|---|
| Class A | 2.2 | 1.5 | 1.7 |
| Class B | 1.5 | 0.7 | 0.8 |
| Class C | 3.9 | 1.9 | 1.8 |
| Class D | 5.0 | 2.6 | 2.6 |
| Class E | 2.3 | 1.6 | 1.8 |
| All | 3.0 | 1.6 | 1.7 |
| Enc. Time | | 50% | |
| Dec. Time | | 94% | |

Figure 6:
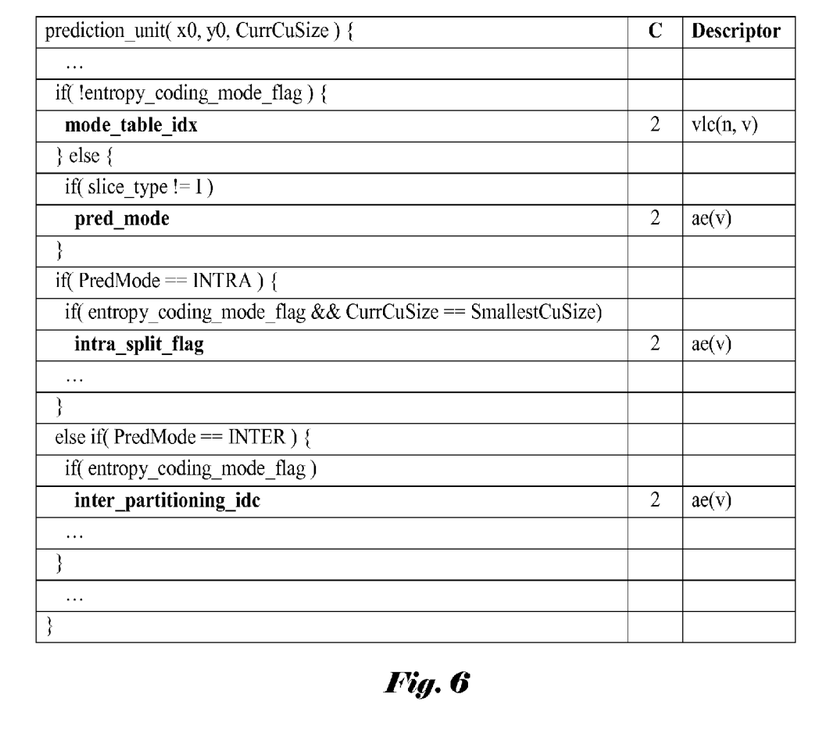
FIG. 6 illustrates an example of syntax design to convey information related to partition for prediction unit.

An example of syntax design to support the constrained PU partition is illustrated in FIG. 6. The mode_table_idx syntax element denotes the prediction mode and the partition mode for Low Complexity Entropy Coding (LCEC). Although this syntax element in Table FIG. 6 appears to be the same as that in the conventional HEVC as of November 2010, its meaning has to be modified accordingly. When the current CU size is larger than the SCU size, there is no codeword associated with N×N partition size for both INTRA and INTER prediction modes. There is no codeword associated with 2N×2N for 1 slice INTRA neither. The codeword associated with 2N×2N for B slice INTRA needs to be modified as well. When the current CU size is the same as the SCU size, codewords of NxN partition modes for both INTRA and INTER prediction modes exist. The intra_split_flag denotes the 2N×2N partition mode if intra_split_flag=0 and denotes the N×N partition mode if intra_split_flag=1. This flag is used when INTRA prediction mode is selected and CABAC is used. If the current CU size is larger than the SCU size, this flag will not be transmitted, and the 2N×2N partition mode will be indicated. The inter_partitioning_idc syntax element denotes the partition mode when INTER prediction mode is selected and CABAC is used. Although this syntax element in FIG. 6 appears to be the same as that in the conventional HEVC as of November 2010, its meaning has to be modified accordingly. When the current CU size is larger than the SCU size, there is no codeword associated with N×N partition. When the current CU size is the same as the SCU size, a codeword associated with N×N partition exists.

Table 7 illustrates an example of codewords for the case of INTER slice (or picture) and INTER prediction according to the conventional HEVC as of November 2010. Besides the symmetric partition sizes of 2N×2N, 2N×N, N×2N and N×N, optional asymmetric partition sizes of 2N×nU, 2N×nD, nL×2N and nR×2N are also listed in Table 7. The codewords associated with the optional partition sizes are shown in Italic style to differentiate them from the codewords for the standard symmetric partition. When the standard symmetric partition is used, the codewords 1, 01, 001 and 0001 are assigned to partition sizes 2N×2N, 2N×N, N×2N and N×N respectively. The codewords for the case of INTER slice (or picture) and INTER prediction for constrained PU partition according to the present invention are shown in Table 8. Since the N×N partition size is not used, there is no need to assign a codeword to the N×N partition size.

TABLE 7

| INTER Slice (Picture) INTER Prediction | |
|---|---|
| 2Nx2N | 1 |
| 2NxN | 01 *1* |
| *2NxnU* | *0100* |
| *2NxnD* | *0101* |
| Nx2N | 001 *1* |
| *nLx2N* | *00100* |
| *nRx2N* | *00101* |
| NxN | 0001 |

TABLE 8

| INTER Slice (Picture) INTER Prediction | |
|---|---|
| 2Nx2N | 1 |
| 2NxN | 01 *1* |
| *2NxnU* | *0100* |
| *2NxnD* | *0101* |
| Nx2N | 001 *1* |
| *nLx2N* | *00100* |
| *nRx2N* | *00101* |

Table 9 illustrates an example of codewords for the case of INTER slice (or picture) and INTRA prediction according to the conventional HEVC as of November 2010, where both 2N×2N and N×N partition sizes are allowed. The codewords for the case of INTER slice (or picture) and INTRA prediction for constrained PU partition according to the present invention are shown in Table 10. Since the N×N partition size is not used, there is no need to assign a codeword to the N×N partition size.

TABLE 9

| INTER Slice (Picture) INTRA Prediction | |
|---|---|
| 2Nx2N | 0 0 0 0 0 |
| NxN | 0 0 0 0 1 |

TABLE 10

| INTER Slice (Picture) INTRA Prediction | |
|---|---|
| 2Nx2N | 0 0 0 |

Table 11 illustrates an example of codewords for the case of INTRA slice (or picture) and INTRA prediction according to the conventional HEVC as of November 2010, where both 2N×2N and N×N partition sizes are allowed. The codewords for the case of INTRA slice (or picture) and INTRA prediction for constrained PU partition according to the present invention are shown in Table 12. Since the N×N partition size is not used, there is no need to assign a codeword for N×N partition size.

TABLE 11

| INTRA Slice (Picture) INTRA Prediction | |
|---|---|
| 2Nx2N | 1 |
| NxN | 0 |

TABLE 12

| INTRA Slice (Picture) INTRA Prediction |
|---|
| 2Nx2N |

Figure 7:
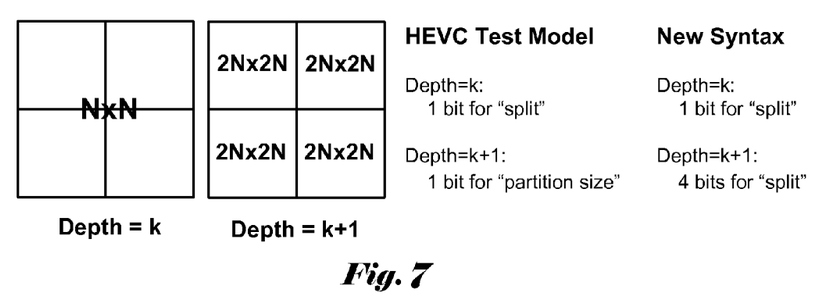
FIG. 7 illustrates an example of syntax associated with constrained partition set for INTRA partition sizes at depths k and k+1.

For the INTRA partition size, the conventional HEVC as of November 2010 uses one bit at depth k to indicate whether the block is split or not, and one bit to indicate the partition size. For the partition example shown in FIG. 7, the conventional HEVC will use one bit to indicate the block is split. After splitting, all blocks have the same size and the conventional HEVC will use another bit to indicate the partition size. Therefore, a total of 2 bits are required by the conventional HEVC for the example in FIG. 7. On the other hand, according to a modified method that uses one bit at depth k to indicate whether the block is split. If the block is split, one bit for each of the blocks at depth (k+1) is needed. Therefore, a total of 5 bits will be required by the modified method for the example in FIG. 7. Therefore, new syntax design is needed to improve the efficiency.

Figure 8:
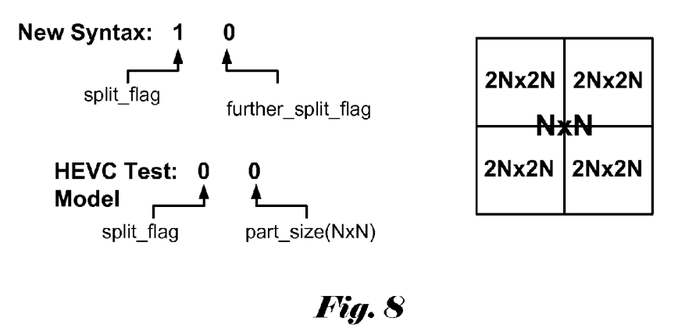
FIG. 8 illustrates an example of bitstream associated syntax of PU partition at depths k and k+1.
Figure 9A:
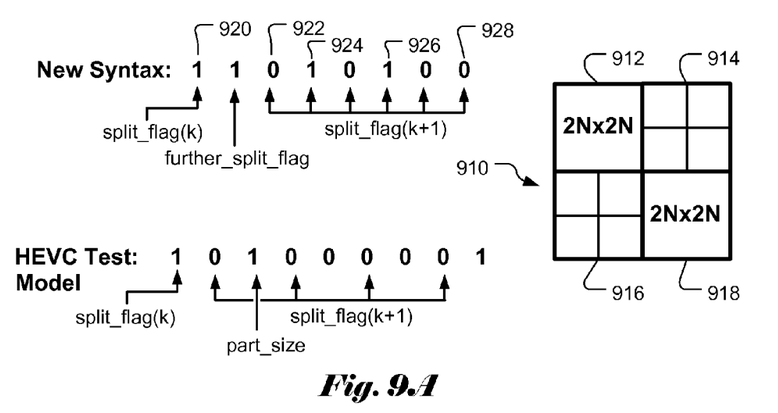
FIG. 9A illustrates an example of bitstream associated syntax of PU partition from depths k through depth k+2.

In order to improve the efficiency, an example of new syntax design is shown in FIG. 8, where a new syntax element further_split_flag is introduced. The new syntax element according to one embodiment of the present invention assigns a value 1 if at least one of the four CUs at the next depth needs further split and assigns further_split_flag a value of 0 if none of the four CUs at the next depth needs further split. According to the new syntax design, the resulted bits representing the partition are shown in FIG. 8. Since there is no need for further split at depth k+1, a single bit for further_split_flag indicates that none of the four CUs at depth k+1 is further split. Therefore, 2 bits in total are required by the constrained partition using the new syntax design of FIG. 8 and the constrained partition using the new syntax design has the same efficiency as the conventional HEVC. FIG. 9A illustrates an example where at least one CU at depth (k+1) is further split. The CU 910 at depth k is split into four CUs labeled as 912, 914, 916 and 918 respectively. For the resulted bits based on the new syntax, the first bit labeled as 920 corresponds to the CU 910. Since CU 910 is split, the split_flag(k) bit labeled as 920 has a value of 1. The following bit corresponds to further_split_flag and has a value of 1 since at least one of the four CUs labeled as 912, 914, 916 and 918 is further split. The bits labeled as 922 and 928 correspond to CUs 912 and 918 respectively. Since CUs 912 and 918 are not split, the corresponding split_flag(k+1) bits 922 and 928 have a value of 0. On the other hand, the bits labeled as 924 and 926 correspond to CUs 914 and 916 respectively. Since CUs 914 and 916 are split, the corresponding split_flag(k+1) bits 924 and 926 have a value of 1. Since CUs 914 and 916 are not further split at depth (k+2), both the bit following bit 924 and the bit following bit 926 have a value of 0 as shown is FIG. 9A. Consequently, the resulted bitstream according to the new syntax contain 8 bits. On the other hand, the resulted bitstream according to the HEVC Test Model (HM) contain 9 bits. Therefore, the new syntax is more efficient than the conventional HEVC for this example.

Figure 9B:
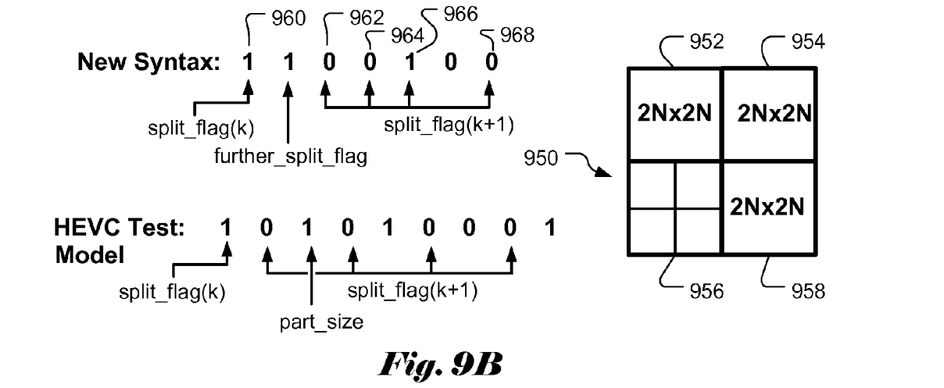
FIG. 9B illustrates another example of bitstream associated syntax of PU partition from depths k through depth k+2.
Figure 10:
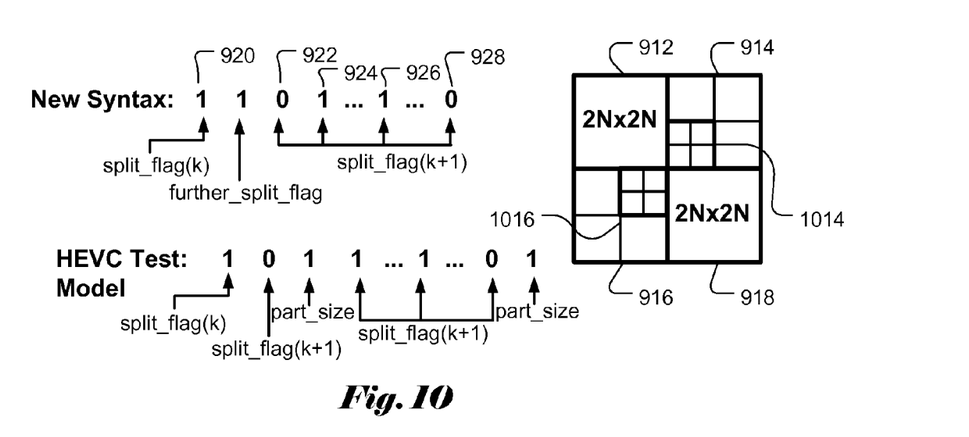
FIG. 10 illustrates an example of bitstream associated syntax of PU partition from depths k through depth k+3.
Figure 11:
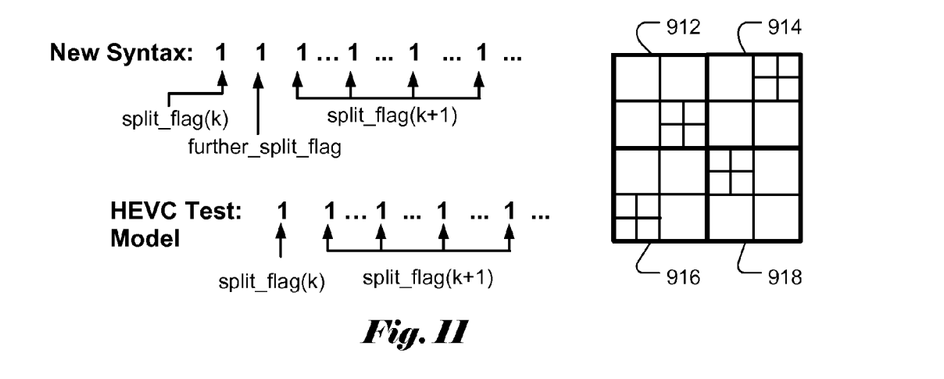
FIG. 11 illustrates an example of bitstream associated syntax of PU partition from depths k through depth k+4.

FIG. 9B illustrates another example where only one CU at depth (k+1) is further split. The CU 950 at depth k is split into four CUs labeled as 952, 954, 956 and 958 respectively. The CU 956 at depth (k+1) is further split, while the other three CUs at depth (k+1) are not further split. For the resulted bitstream based on the new syntax, the first bit labeled as 960 corresponds to CU 950. Since CU 950 is split, the split_flag (k) bit labeled as 960 has a value of 1. The following bit corresponds to further_split_flag and has a value of 1 since at least one of the four CUs labeled as 952, 954, 956 and 958 is further split. The bits labeled as 962, 964 and 968 correspond to CUs 952, 954 and 958 respectively. Since CUs 952, 954 and 958 are not split, the corresponding split_flag(k+1) bits 962, 964 and 968 have a value of 0. On the other hand, the bit labeled as 966 corresponds to CU 956. Since CU 956 is split, the corresponding split_flag(k+1) bit 966 has a value of 1. Since CU 966 is not further split at depth (k+2), the bit following bit 966 has a value of 0 as shown is FIG. 9B. The resulted bitstream according to the new syntax contain 7 bits. On the other hand, the resulted bitstream according to the HEVC Test Model (HM) contain 9 bits. Therefore, the new syntax is more efficient than the conventional HEVC for this example FIG. 10 illustrates an example corresponding to further split of example in FIG. 9A, where one of the CUs in CU 914 and one of the CUs in CU 916 are further split, labeled as 1014 and 1016 respectively. To indicate this further split, the corresponding bits are shown in FIG. 10 by assigning a value of 1 to the bit following the bit 924 and to the bit following bit 926 respectively. Only the bitstream at depths k and k+1 are shown in FIG. 10 and the bitstream for depth k+2 and beyond are shown as dots in FIG. 10. Therefore, the new syntax design requires 6 bits to represent the partition at depths k and k+1 while the conventional HEVC requires 7 bits. FIG. 11 illustrates a further example, where all CUS 912, 914, 916 and 918 are further split at the next two depths. The resulted bitstreams based on the new syntax and the HEVC Test Model are shown in FIG. 11, where the new syntax requires 6 bits while the conventional HEVC required 5 bits for partition at depths k and k+1. As shown in the examples above, the new syntax is more efficient in most cases than the conventional HEVC.

Figure 12:
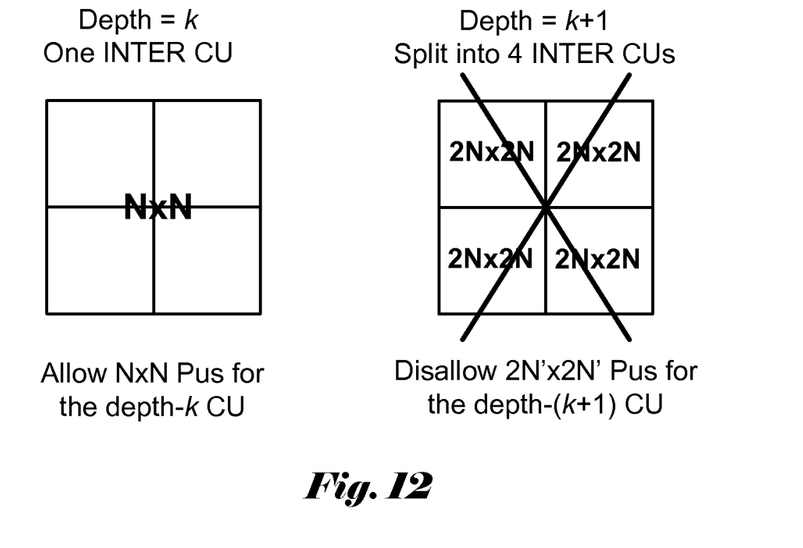
FIG. 12 illustrates an example of constrained partition for prediction unit at depths k and k+1 in the INTER mode.
Figure 13:
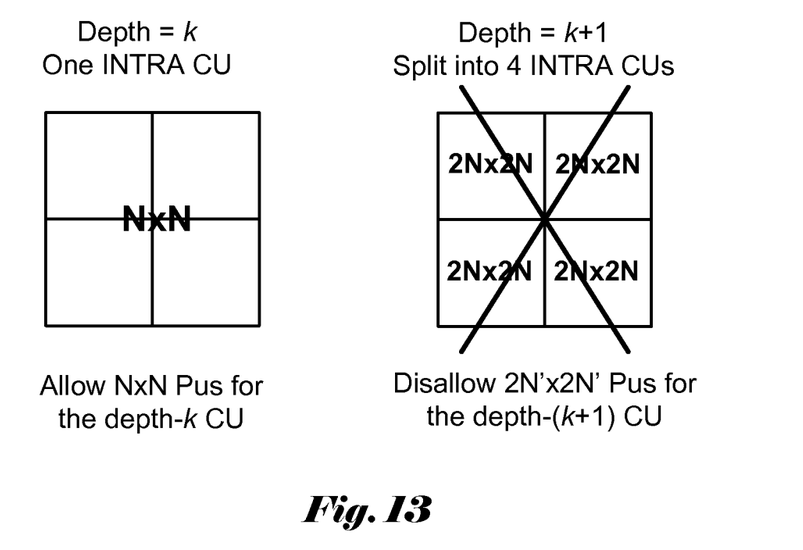
FIG. 13 illustrates an example of constrained partition set for prediction unit at depths k and k+1 in the INTRA mode.

FIG. 12 illustrates another constrained PU partition example according to the present invention for INTER mode. In this case, a depth-k INTER CU still can use N×N PUs. However, the four depth-(k+1) INTER CUs cannot use 2N'× 2N' PUs simultaneously. FIG. 13 illustrates another constrained PU partition according to the present invention for INTRA mode. In this case, a depth-k INTRA CU still can use N×N PUs. However, the four depth-(k+1) INTRA CUs cannot use 2N'×2N' PUs simultaneously.

Figure 14:
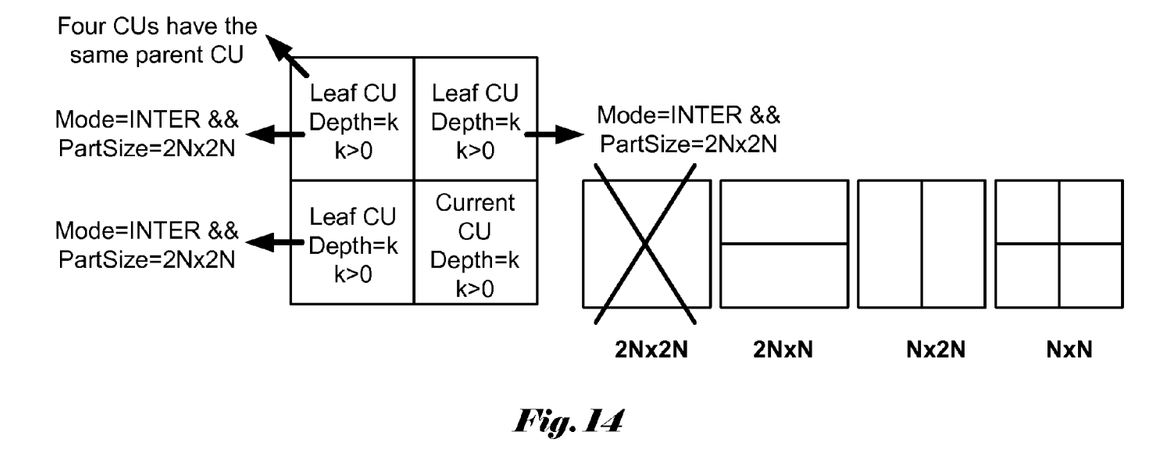
FIG. 14 illustrates an example of alternative constrained partition set for prediction unit at depths k and k+1 in the INTER mode.
Figure 15:
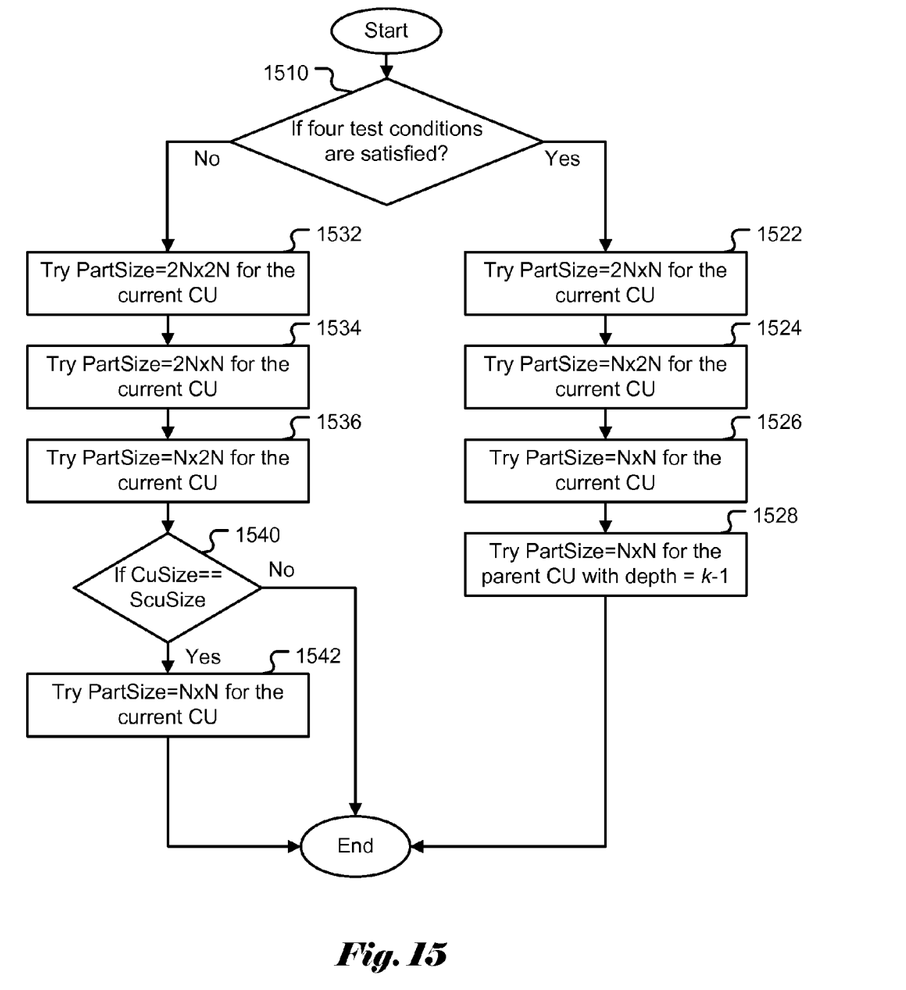
FIG. 15 illustrates an exemplary flowchart of determining constrained partition set for prediction unit in INTER mode at depths k and k+1.

For each 2N×2N leaf CU at depth k, the following four conditions are tested to determine whether 2N×2N partition size is allowed for INTER mode. If all four conditions are satisfied, the 2N×2N partition is disallowed as shown in FIG. 14. Otherwise, all four partition sizes, 2N×2N, 2N×N, N×2N and N×N, are allowed. The four conditions are (a) if k>0 (i.e., smaller than the LCU size), (b) if the current CU is the last (fourth) leaf CU of its parent CU, (c) if the prior three leaf CUs have depth=k" and (d) if the prior three leaf CUs have Mode=INTER and Part Size=2N×2N. FIG. 15 illustrates an exemplary flowchart of determining constrained partition for prediction unit in INTER mode at depths k and k+1. The four conditions are tested in block 1510. If the four test conditions are satisfies, the partition size 2N×2N is skipped, i.e., partition sizes {2N×N, N×2N, N×N} are tried in blocks 1522, 1524 and 1526 respectively. Furthermore, the partition size N×N for the parent CU at depth (k−1) is also tries in block 1528 and the process is completed. If any of the four test conditions is not satisfied, partition sizes {2N×2N, 2N×N, N×2N} are tried as shown in blocks 1532, 1534 and 1536 respectively. The condition of "if the CU size is the same as the SCU size" is tested in block 1540. If the result is asserted, the partition size N×N is also tried as shown in block 1542, otherwise, the partition size N×N is skipped and the process is completed.

Figure 16:
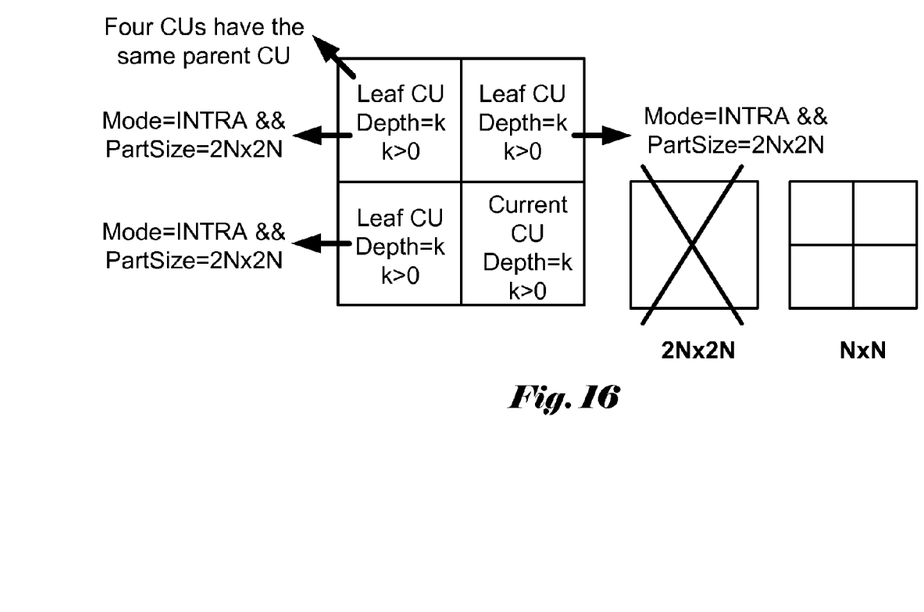
FIG. 16 illustrates an example of alternative constrained partition set for prediction unit at depth k and k+1 in the INTRA mode.
Figure 17:
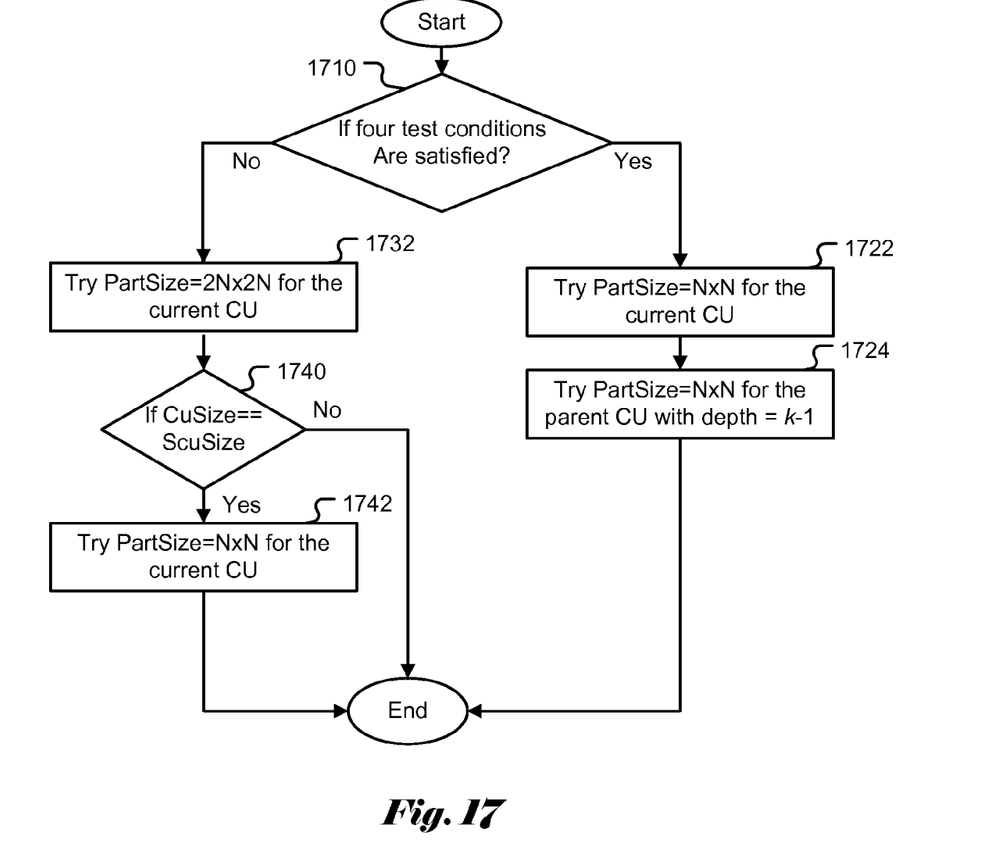
FIG. 17 illustrates an exemplary flowchart of determining constrained partition set for prediction unit in INTRA mode at depths k and k+1.

For each 2N×2N leaf CU at depth k, the following four conditions are tested to determine whether the 2N×2N partition size is allowed for INTRA mode. If all four conditions are satisfied, the 2N×2N partition is disallowed as shown in FIG. 16. Otherwise, both partition sizes, 2N×2N and N×N, are allowed. The four conditions are (a) if k>0 (i.e., smaller than the LCU size), (b) if the current CU is the last (fourth) leaf CU of its parent CU, (c) if the prior three leaf CUs have depth=k" and (d) if the prior three leaf CUs have Mode=INTRA and Part Size=2N×2N. FIG. 17 illustrates an exemplary flowchart of determining constrained partition for prediction unit in INTRA mode at depth k and k+1. The four conditions are tested in block 1710. If the four test conditions are satisfies, the partition size 2N×2N is skipped, i.e., only partition size N×N is tried in blocks 1722. Furthermore, the partition size N×N for the parent CU at depth (k−1) is also tries in block 1724 and the process is completed. If any of the four test conditions is not satisfied, partition size 2N×2N is tried as shown in blocks 1732. The condition of "if the CU size is the same as the SCU size" is tested in block 1740. If the result is asserted, the partition size N×N is also tried as shown in block 1742, otherwise, the partition size N×N is skipped and the process is completed.

Embodiment of video coding with constrained partition for prediction units according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of video processing for a video encoder, the method comprising:
   receiving video data corresponding to a 2N×2N leaf CU (coding unit) at depth k, wherein N is a first integer greater than 0 and k is a second integer greater than or equal to 0;
   partitioning the video data corresponding to the 2N×2N leaf CU into a set of PUs (prediction units) according to a prediction mode of the 2N×2N leaf CU, wherein the set includes N×N partition size and the prediction mode includes an INTER mode and an INTRA mode;
   removing the N×N partition size for the prediction mode if the 2N×2N leaf CU is larger than SCU (smallest CU), wherein a constrained set of PUs is formed when the partition size is removed; and
   applying prediction on the video data according to the prediction mode to generate residue data, wherein said applying prediction on the video data is based on the set of PUs if the 2N×2N leaf CU corresponds to the SCU and said applying prediction on the video data is based on the set of constrained PUs if the 2N×2N leaf CU is larger than the SCU.

2. The method of claim 1, wherein the set of PUs further comprises 2N×2N partition size, 2N×N partition size and N×2N partition size for the INTER mode.

3. The method of claim 1, wherein the set of PUs further comprises 2N×2N partition size for the INTRA mode.

4. The method of claim 1, further comprising a step of incorporating a flag to indicate whether any of next coding units at a next depth is further split.

5. The method of claim 4, wherein if none of the next coding units at the next depth is further split as indicated by the flag, no further information is incorporated to indicate split decision for each of the next coding units at the next depth.

6. A method of video processing for a video encoder, the method comprising:
   receiving video data corresponding to a 2N×2N leaf CU (coding unit) at depth k, wherein N is an integer greater than 0;
   for each N×N leaf CU of the 2N×2N leaf CU:
   evaluating condition 1 to determine if k>0;
   evaluating condition 2 to determine if said each N×N leaf CU is a fourth leaf CU of the 2N×2N leaf CU;
   evaluating condition 3 to determine if three prior leaf CUs have the depth k; and
   evaluating condition 4 to determine if said three prior leaf CUs have a mode of same type and have N×N partition size;
   removing 2N×2N partition size to form a constrained partition set if the condition 1 through the condition 4 are all asserted;
   partitioning said each N×N leaf CU according to the constrained partition set if the condition 1 through the condition 4 are all asserted; and
   applying prediction on the video data to generate residue data based on the constrained partition set.

7. The method of claim 6, wherein the mode type is INTER.

8. The method of claim 6, wherein the mode type is INTRA.

9. A method for decoding of a video bitstream associated with video data in a video decoder, wherein the video data comprises a 2N×2N leaf CU (coding unit) at depth k partitioned into a set of PUs (prediction units) according to a prediction mode of the 2N×2N leaf CU, wherein the set includes N×N partition size and the prediction mode includes an INTER mode and an INTRA mode, the method comprising:
   performing a test to determine if the 2N×2N leaf CU is larger than SCU (smallest CU);
   selecting codewords for the set of PUs according to the test;
   decoding the video bitstream to recover PU partition according to the codewords selected;
   decoding the video bitstream to recover residue data associated with the 2N×2N leaf CU; and
   reconstructing video data associated with the 2N×2N leaf CU based on the set of PUs using the residue data associated with the 2N×2N leaf CU.

10. The method of claim 9, further comprising:
    extracting a flag from the video bitstream, wherein the flag indicates whether any of next coding units at a next depth is further split; and
    recovering structure of the next coding units at the next depth according to the flag.

11. The method of claim 10, wherein if none of the next coding units at the next depth is further split as indicated by the flag, no further information is incorporated in the bitstream for recovering structure of the next coding units at the next depth.

12. An apparatus for video coding, the apparatus comprising:
    means for receiving video data corresponding to a 2N×2N leaf CU (coding unit) at depth k, wherein N is a first integer greater than 0 and k is a second integer greater than or equal to 0;
    means for partitioning the video data corresponding to the 2N×2N leaf CU into a set of PUs (prediction units) according to a prediction mode of the 2N×2N leaf CU, wherein the set includes N×N partition size and the prediction mode includes an INTER mode and an INTRA mode;
    means for removing the N×N partition size for the prediction mode if the 2N×2N leaf CU is larger than SCU (smallest CU), wherein a constrained set of PUs is formed when the partition size is removed; and
    means for applying prediction on the video data according to the prediction mode to generate residue data, wherein said applying prediction on the video data is based on the set of PUs if the 2N×2N leaf CU corresponds to the SCU and said applying prediction on the video data is based on the set of constrained PUs if the 2N×2N leaf CU is larger than the SCU.

13. The apparatus of claim 12, wherein the set of PUs further comprises 2N×2N partition size, 2N×N partition size and N×2N partition size for the INTER mode.

14. The apparatus of claim 12, wherein the set of PUs further comprises 2N×2N partition size for the INTRA mode.

15. The apparatus of claim 12, further comprising means for incorporating a flag when the set of PUs contains more than one PU to indicate whether any of said more than one PU is further split.

16. An apparatus for video processing, the apparatus comprising:
- means for receiving video data corresponding to a 2N×2N leaf CU (coding unit) at depth k, wherein N is an integer greater than 0;
- for each N×N leaf CU of the 2N×2N leaf CU:
  - means for evaluating condition 1 to determine if k>0;
  - means for evaluating condition 2 to determine if said each N×N leaf CU is a fourth leaf CU of the 2N×2N leaf CU;
  - means for evaluating condition 3 to determine if three prior leaf CUs have the depth k; and
  - means for evaluating condition 4 to determine if said three prior leaf CUs have a mode of same type and have N×N partition size;
- means for removing 2N×2N partition size if the condition 1 through the condition 4 are all asserted;
- means for partitioning said each N×N leaf CU according to a constrained partition set if the condition 1 through the condition 4 are all asserted; and
- means for applying prediction on the video data to generate residue data based on the constrained partition set.

17. The apparatus of claim 16, wherein the mode type is INTER.

18. The apparatus of claim 16, wherein the mode type is INTRA.

19. A apparatus for decoding of a video bitstream associated with video data, wherein the video data comprises a 2N×2N leaf CU (coding unit) at depth k partitioned into a set of PUs (prediction units) according to a prediction mode of the 2N×2N leaf CU, wherein the set includes N×N partition size and the prediction mode includes an INTER mode and an INTRA mode, the apparatus comprising:
- means for performing a test to determine if the 2N×2N leaf CU is larger than SCU (smallest CU);
- means for selecting codewords for the set of PUs according to the test;
- means for decoding the video bitstream to recover PU partition according to the codewords selected;
- means for decoding the video bitstream to recover residue data associated with the 2N×2N leaf CU; and
- means for reconstructing video data associated with the 2N×2N leaf CU based on the set of PUs using the residue data associated with the 2N×2N leaf CU.

20. The apparatus of claim 19, further comprising:
- means for extracting a flag from the video bitstream, wherein the flag indicates whether any of next coding units at a next depth is further split; and
- means for recovering structure of the next coding units at the next depth according to the flag.

* * * * *